United States Patent

Lockshaw

[11] Patent Number: 5,008,008
[45] Date of Patent: Apr. 16, 1991

[54] UNIVERSALLY ADAPTABLE POOL WATER FILTER STRUCTURE

[76] Inventor: James Lockshaw, 2401 S. Pullman, Santa Ana, Calif. 92705

[21] Appl. No.: 44,592

[22] Filed: Apr. 30, 1987

[51] Int. Cl.⁵ ............................................. B01D 29/13
[52] U.S. Cl. .................................. 210/169; 210/240; 210/289; 210/323.2; 210/346; 210/416.2
[58] Field of Search ............ 210/232, 233, 239, 323.2, 210/346, 169, 416.2, 289, 240

[56] References Cited

U.S. PATENT DOCUMENTS

| | | | |
|---|---|---|---|
| 654,592 | 7/1900 | Barr | 210/323.2 |
| 2,960,232 | 11/1960 | Gillette | 210/169 |
| 3,278,034 | 10/1966 | West | 210/169 |
| 3,279,608 | 10/1966 | Soriente et al. | 210/232 |
| 3,498,460 | 3/1970 | Lane | 210/232 |
| 3,502,214 | 3/1970 | Mills et al. | 210/323.2 |
| 3,519,135 | 7/1970 | Lerner | 210/289 |
| 3,522,886 | 8/1970 | Edmiston et al. | 210/346 |
| 3,767,050 | 10/1973 | Reiner | 210/169 |
| 4,610,787 | 9/1986 | Morgan et al. | 210/239 |

Primary Examiner—Stanley Silverman
Assistant Examiner—Neil M. McCarthy
Attorney, Agent, or Firm—Arthur J. Plantamura

[57] ABSTRACT

A universal swimming pool water filter apparatus for a bottom opening tank comprising multiply useful dual reverse flow port means and cooperating filter medium support having various filtered water passing openings arranged to accommodate fixed cloth or free particulate filtering media, the port means flow being varied with the type of filtering medium support so that a minimum of different production parts are needed to meet all filtering needs, with a consequent reduction in manufacturing equipment and parts inventory.

23 Claims, 5 Drawing Sheets

UNIVERSALLY ADAPTABLE POOL WATER FILTER STRUCTURE

TECHNICAL FIELD

This invention has to do with filters for pool water filtration, and is more particularly concerned with an improvement in such filters enabling use of various conventional filter medium structures in a single style of tank with a universally adaptable filter medium support.

BACKGROUND OF THE INVENTION

In general there are three types of filter media used in swimming pool water filtration. These are sand and sand substitutes, which may be considered to be free particulate type filter media, and fixed cloth type media, namely leaf filters and cartridge filters. In different applications one or another medium is preferred by the pool installer and manufacturers have been required to manufacture and inventory more than one type of housing and accessories, (the housing and the accessories being all parts of the filter other than the medium contained therein and both being hereinafter referred to as the "filter structure") for containment of the filter medium. This effort may lead to excessive inventories if the market is other than as predicted for a given model and version of a filter structure, to increased manufacturing costs from model changeover and multiple manufacturing lines, and undue capital expense for manufacturing equipment.

SUMMARY OF THE INVENTION

It is accordingly an object of the present invention to provide a universally adaptable pool water filter structure for use with a variety of different filter media. It is another object to provide a filter structure which accepts either cartridge or leaf filter. It is a still further object to provide a dual port arrangement for a pool water filter tank in which the flow directions are alternate and reversible in response to the type of filtering medium being used and which supports the filtering medium support appropriately for different types of filtration media.

These and other objects to become apparent hereinafter are realized in accordance with the invention in a swimming pool water filter adapted for recirculating water to and from a swimming pool, the filter comprising a filtering medium of the cartridge, leaf or free particulate type, and a filter structure containing such medium in pool water filtering relation, the structure comprising a tank enclosing the filtering medium, the tank having a bottom opening; a fitting in the tank bottom opening, the fitting defining first and second ports adapted for inward or outward water flow in opposed relation, the first port communicating a first portion of the tank interior immediately adjacent the port with swimming pool water beyond the tank, the second port having a continued extent vertically within the tank, a filtering medium support comprising a disc supporting the filtering medium adjacently above the tank bottom opening, the disc defining a plurality of openings for receiving filtered water from the filtering medium, the disc being coupled to the second port continued extent for outflow of received filtered water from the filtering medium through the second port when the filtering medium is a cartridge or leaf filter and for inflow of unfiltered water to the filtering medium when the filtering medium is free particulate, and conversely the first port having an inward flow of unfiltered water when the second port flow is outward and outward flow of filtered water when the second port is inward.

In this and like embodiments: the fitting comprises a molded plug body sealably mounted in the tank bottom opening, the first and second ports being formed along parallel axes within the plug body each offset from the tank vertical axis, the second port continued extent projecting into the tank above the plug body in angled relation to intersect the tank vertical axis; the filtering medium may be a mass of free particulate, the disc being generally conical and defining multiple concentric series of circularly distributed openings adapted to pass filtered water in particulate blocking relation, the conical disc having a central bore for snugly receiving the second port continued extent in unfiltered water passing relation to the particulate filtering medium, and the conical disc openings are downwardly divergent; or, the filtering medium is a cartridge filter medium comprising a generally cylindrical mass of filter medium around a tubular downcomer, the disc defining a circularly distributed set of openings adapted to receive the lower end of each the downcomer in communicating relation with the second port; the disc has upper and lower horizontally divided halves, the lower half being coupled to the second port continued extent, the upper half being joined to the lower half and defining the openings, the upper and lower halves defining a water collection chamber in open communication with the filter downcomers and the second port continued extent; or, the filtering medium is a leaf filter medium comprising an arcuate frame having a central tubular downcomer, and a filter cloth over the frame, the disc defining a circularly distributed set of openings adapted to receive the lower end of each the downcomer in communicating relation with the second port, the disc having upper and lower halves, the lower half being coupled to the second port continued extent, the upper half being joined to the lower half and defining the openings, the upper and lower halves defining a water collection chamber in open communication with the filter downcomers and the second port continued extent, the disc openings for the downcomers forming one set of such openings, and including also a second set of openings adapted to receive the downcomers of cartridge filters, only the leaf filter downcomer receiving openings being open.

In another embodiment there is provided a swimming pool water filter comprising a fixed cloth filtering medium and a filter structure containing the medium in pool water filtering relation, the structure comprising a tank wall having an upper opening and a lower opening, a separable closure for the upper opening, water inlet and outlet means sealably received in the lower opening, and a fixed cloth filtering medium support spaced adjacently above the lower opening, the medium support comprising a disc having integrally formed therein plural sets of circularly distributed openings for receiving filtered water from the medium for communication internally through the disc to the water outlet means, respective sets of the openings being differently sized and differently relatively disposed for different filter media, and means closing one or another of the sets in the alternative in the tank mounted condition of the support.

In this embodiment typically, the disc comprises a plastic molding, the disc defines a circularly distributed series of lobes, each of the lobes having openings of each of the alternative sets, the medium support has upper and lower horizontally extended and substantially coextensive portions, the lower portion communicating the support with the outlet, the upper portion defining the respective sets of openings, each of the sets being communicable in pool water flow receiving relation with a fixed cloth filter element, the lower portion being in open communication with the set openings, there is also included a filter element extending vertically within the tank, the filter element having an extended surface of filtering media and means to collect pool water passing through the media in filtering relation, the collecting means communicating directly with an opening of one or another of the sets.

In those embodiments wherein the filter element is a cartridge, the filter support structure upper portion defines a series of circularly distributed openings each receiving a filter cartridge in supporting relation, the upper portion further defining other filter element supporting openings, the other openings being blocked against unfiltered water flow therethrough.

In those embodiments in which the filter element is a leaf filter element, the filter support structure upper portion defines a series of circularly distributed openings each receiving a leaf filter element in supporting relation, the upper portion further defining other filter element supporting openings, the other openings being blocked against unfiltered water flow therethrough.

Accordingly in these embodiments, each other filter element supporting opening is adapted to receive when unblocked a cartridge filter or a leaf filter element respectively.

Typically, the medium support upper and lower portions are separately molded mating parts, the tank upper opening is greater in diameter than the mounting locus of the filter elements in their respective openings and is defined by radially sloped shoulders, and including also a cover having radially sloped shoulders and a hipped clamping strap simultaneously engaging the sloped shoulders of both the opening and the cover with its hipped portions and traversing the intersection of the opening shoulders and the cover shoulders with an intermediate flat portion.

In yet another embodiment there is provided a filter element support for disposition in a filter tank, the support comprising upper and lower halves, the lower half having an upwardly open wall and a downwardly directed outlet adapted to communicate with the outlet of a filter tank, the upper half mating with the lower half and having a downwardly open wall substantially coextensive with the lower half wall and defining with the lower half wall an enclosed chamber in water tight relation, the upper half defining a first set of openings adapted to support the center rib downcomer of a leaf filter element and to interiorly communicate the center rib downcomer with the chamber in filtered water passing relation, the upper half further defining in alternating juxtaposition a second set of openings adapted to support the center downcomer of a cartridge filter element, the second sets being blocked against water passage therethrough when the first set is in supporting relation with the filter leaves, and first set being blocked against water passage therethrough when the second set is in supporting relation with the cartridge filter elements, the respective open and blocked sets being determined by the presence of the leaf filter or cartridge elements respectively in the filter tank, separately or in combination with a plug having a first port defining a water inlet to the filter tank and a second port defining the water tank outlet and having a continued extent into the tank, the filter element support being supported within the tank by the second port continued extent, the second port and the center axis of the filter element support being relatively laterally offset.

In still another embodiment, there is provided in a swimming pool water filtering tank a free particulate filtering medium support comprising a conical disc having multiple concentric series of circularly distributed filtered water passing openings in vertically spaced relation, the openings being each downwardly divergent for maximum water flow without passage of particulate through the onset of the openings.

THE DRAWING

The invention will be further described as to an illustrative embodiment thereof in connection with the attached drawings, in which.

PREFERRED MODES

Figure 1:
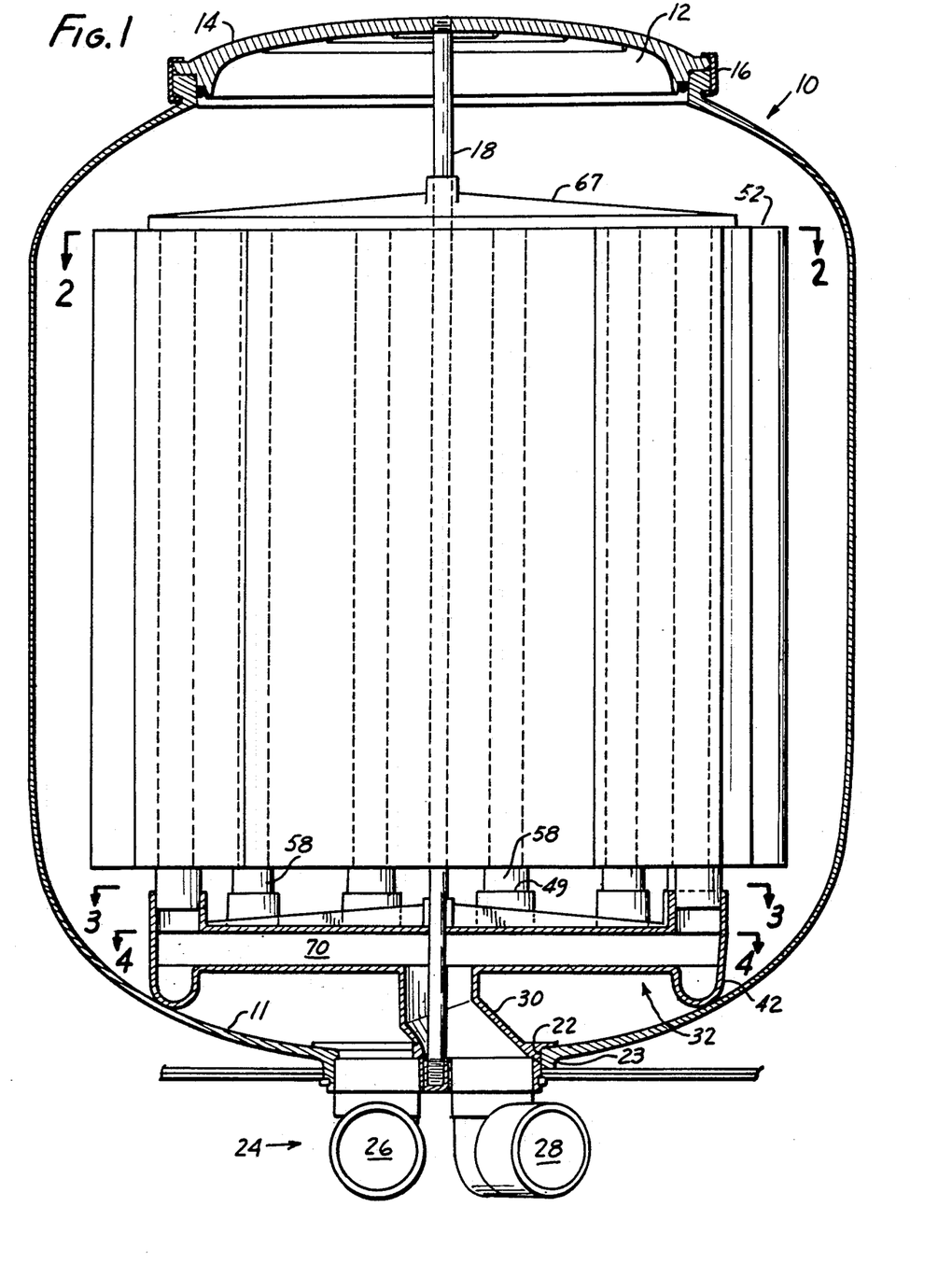
FIG. 1 is a view generally in vertical section of the filter structure according to the invention with a leaf filter in place.

With reference now to the drawing in detail, in FIG. 1 tank 10 comprises a suitably strong, generally cylindrical shell of metal or a fiber-reinforced plastic having a relatively large top opening 12 to which a closure 14 is fitted locked to the tank by a hipped band 16 and a latch not shown. A threaded rod 18 extends centrally through the tank 10 supported at the closure 14 for purposes to appear. The tank has a bottom opening 22 surrounded by a neck 23 into which a bottom fitting in the form of a plug 24 is fitted threaded onto the rod 18 as shown, the plug having a first port 26 shown adapted for inlet of water from a swimming pool (not shown) for movement through the height of the tank 10 for eventual filtration and return. The plug 24 further has a second port 28 and laterally offset from the first port 26 and integrally molded with the first port and the remainder of the plug body. The second port 28 has a continued extent 30 of like diameter which is deflected above the port proper to center on the vertical axis of the tank 10. The port 28 is shown in FIG. set up for receiving outflow water already filtered for return to the pool, but, as will be seen the flow in second port 28 can be reversed in concert with reversal of flow in the first port 26 so that tank 10 inflow is through the second port and its continued extent 30 into the tank 10 interior beyond the filter support 32 rather than under that support, and the tank outflow is conversely through the first port, Cf. support 80 in FIG. 5.

Figure 2:
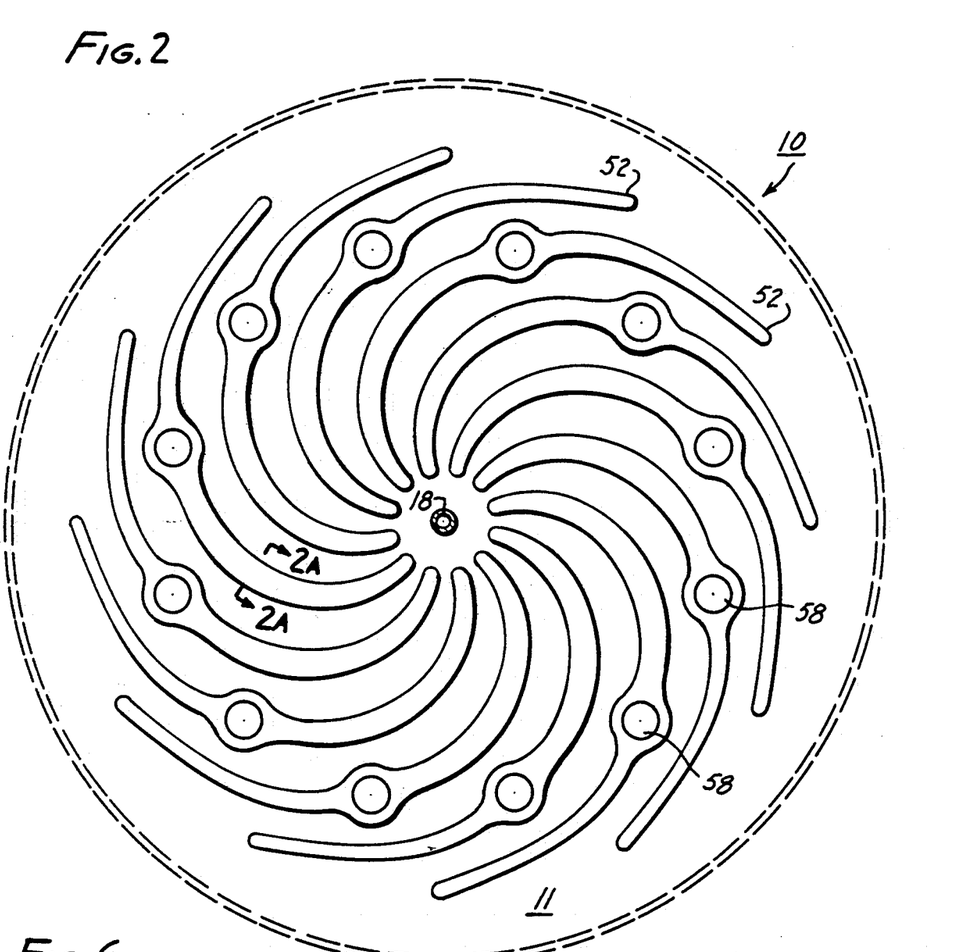
FIG. 2 is a view taken on line 2—2 in FIG. 1.
Figures 2A, 3, 4:
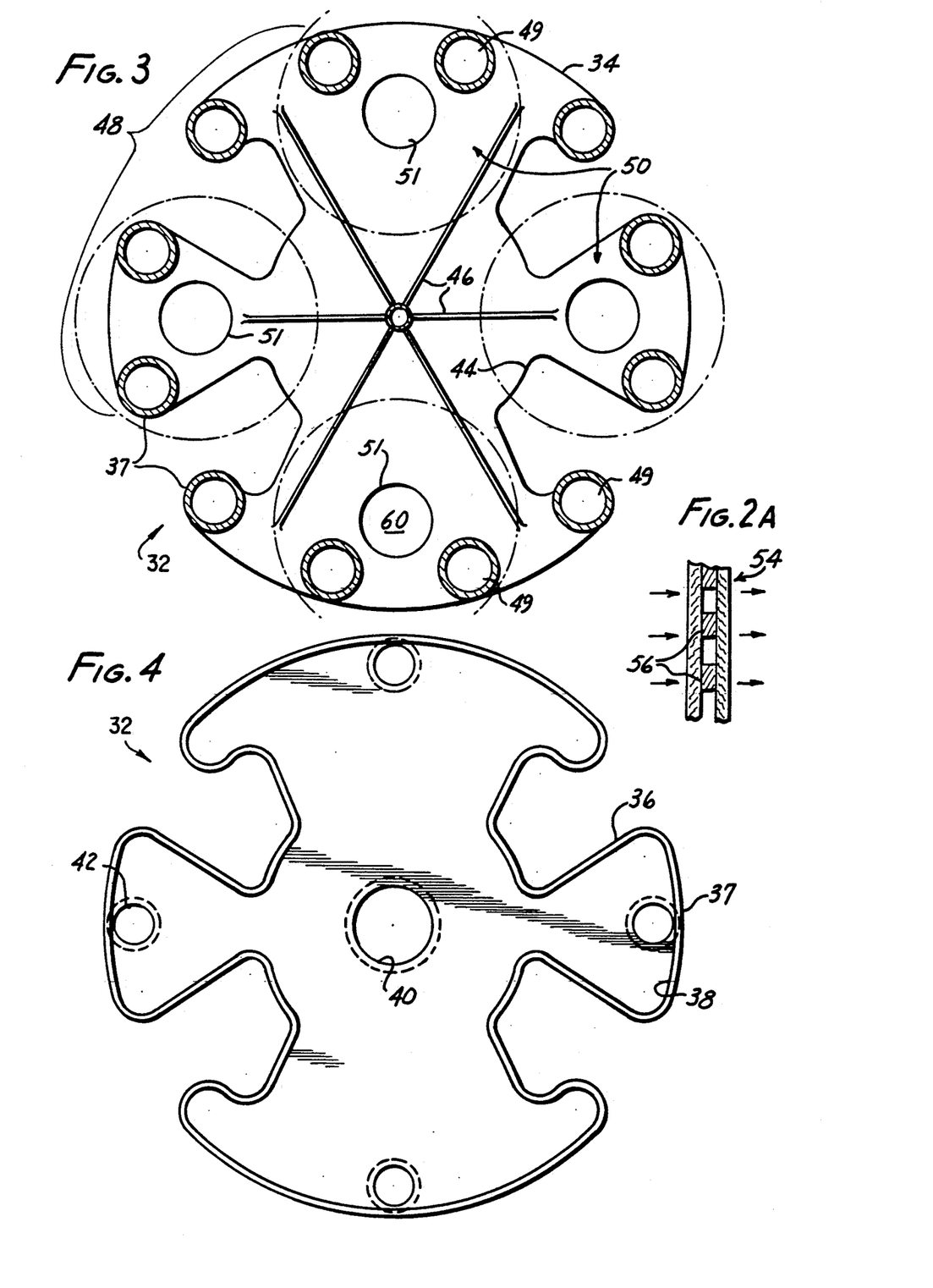
FIG. 2A is a fragmentary view taken on line 2A—2A in FIG. 2.
FIG. 3 is a view taken on line 3—3 in FIG. 1.
FIG. 4 is a view taken on line 4—4 in FIG. 1.
Figure 8:
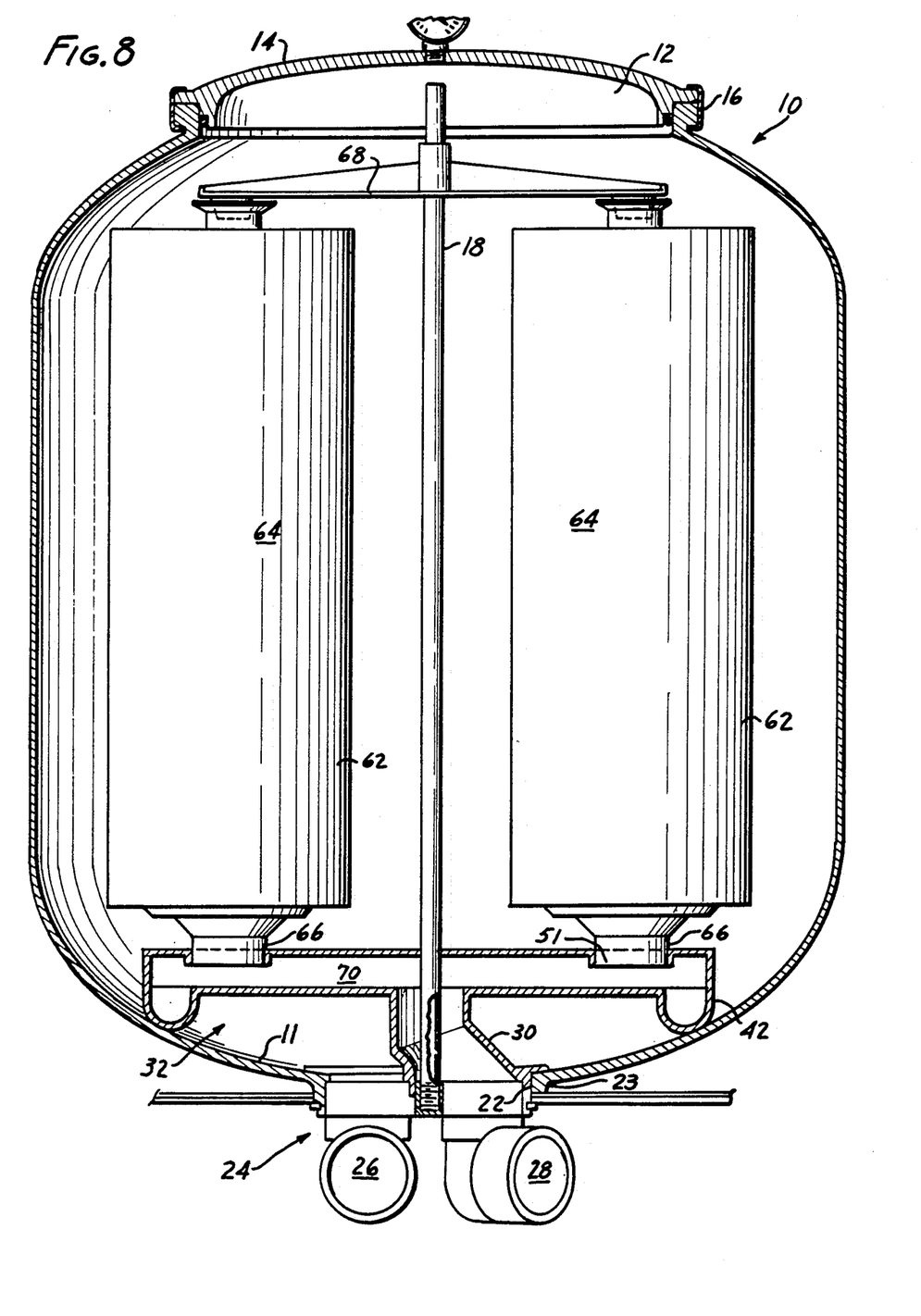
FIG. 8 is a view like FIG. 1 with a cartridge filter in place.

As best shown in FIGS. 3 and 4, the filter support 32 in FIGS. 1 and 8 comprises a plastic molded disc of generally circular configuration having an upper portion 34 constituting the top half of the support and a lower portion 36 constituting the bottom half of the support. The bottom half 36 comprises an upwardly open wall 38 having a center bore 40 formed therein and feet 42 by which it rests on the tank 10 lowermost wall 11. The upper half 34 comprises a downwardly open wall 44 having a rib structure 46 for added strength, and first and second sets 48, 50 of openings 49, 51. The upper and lower halves 34, 36 interfit a slight distance for accuracy of alinement and strengthening of the joint after sealing. The upper and lower halves 34, 36 define lobes 37 in which the openings 49, 51 are located. As will be noted in the drawing, the openings 49 are relatively more radially outwardly displaced than openings 51, and are smaller and more numerous. The openings 49 are sized and arranged to receive and support a fixed cloth leaf type filter assembly; the openings 51 are sized and arranged to receive and support a fixed cloth cartridge type filter assembly. The leaf type filters used herein are conventional. As is well known, leaf type filters, shown at 52 in FIGS. 1, 2 and 2A, comprise a cloth covered plastic frame 54 of horizontal members 56 which are attached to and feed water to a central tubular downcomer 58. The lower end of the downcomer 58 is inserted snugly in the corresponding opening 49 as shown in FIG. 1. For purposes of the present invention of having multiple uses for the several molded parts, the support 32 has both leaf and cartridge filter support openings 49, 51. When the filter support 32 is used with a leaf type filter, FIG. 1, the openings 51 are closed off, suitably by the web left when the support 32 is molded. In practice it is efficient to mold the support 32 with the openings 49 and 51 left closed by thin webs 60, the appropriate ones of which are removed at the time of installation of the support in filter tank 10. In the FIG. 1 embodiment the openings 51 are left closed since these are intended for the cartridge type filter.

With reference particularly to FIG. 8, cartridge filter assemblies 62 are shown mounted on the support 32. As with the leaf type filters, the presently used cartridge filters are of conventional design and comprise a generally cylindrically arranged frame elements (not shown) enclosed by a suitably porous cloth 64 fixed over the frame. The cartridge filters 62 have a central tubular downcomer 66 into which the filtered water is passed and by which the water is carried downwardly. The lower ends of the cartridge downcomers 66 are snugly received in the openings 51.

In both the leaf filter and the cartridge filter embodiments upper brackets 67, 68 respectively hold the filter elements from above, while the support 32 supports the filter elements from below. The brackets 67, 68 are held in place by rod 18 passing therethrough. The rod 18 then continues to the closure 14 where it is secured as shown.

Figure 5:
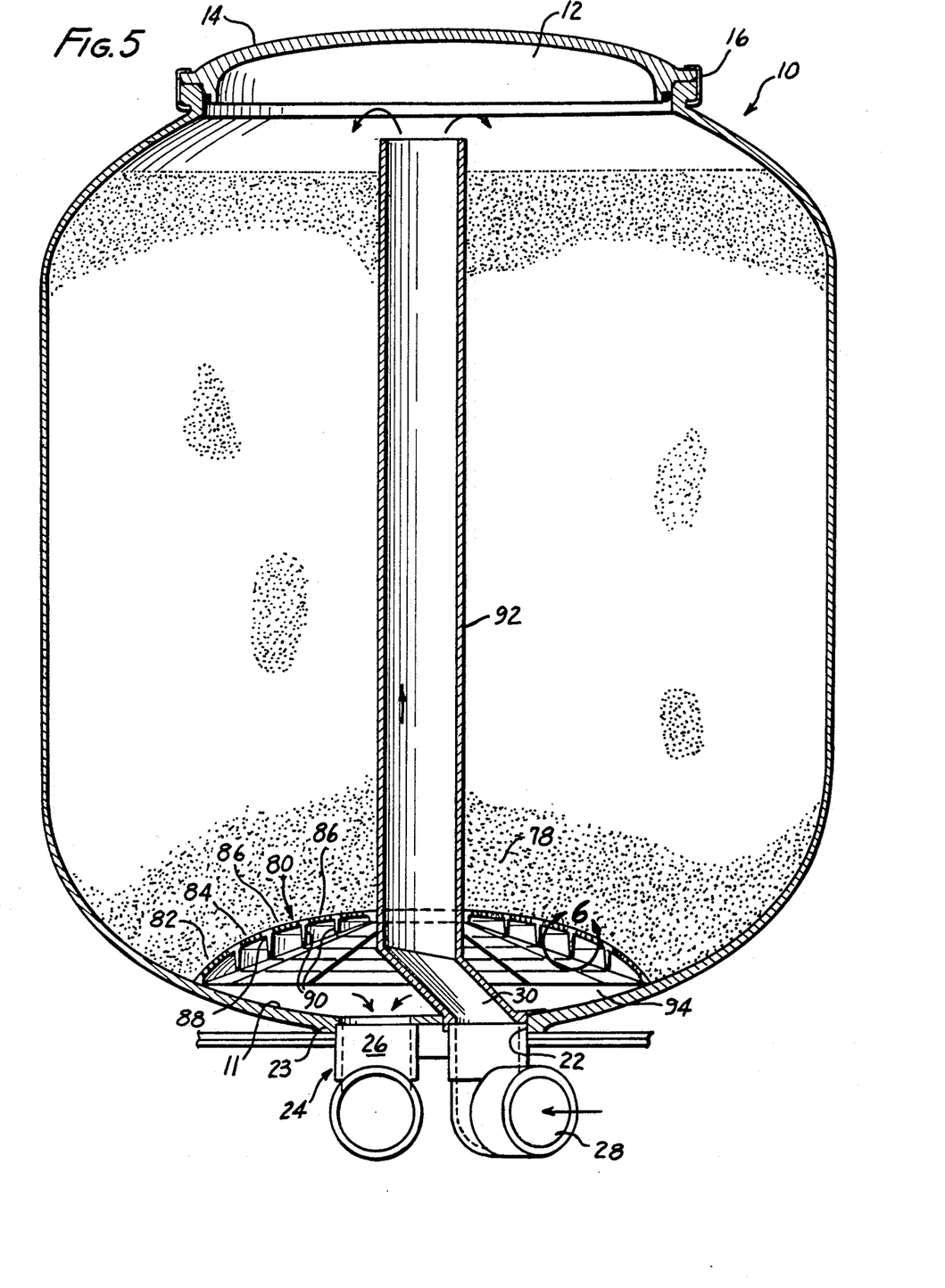
FIG. 5 is a view like FIG. 1 with a free particulate filter medium and its support in place.

In both the leaf filter and the cartridge filter embodiments the filtered water is collected in the chamber 70 defined by the upper and lower halves 34, 36 of the filter support 32 and proceeds via the second port continued extent 30 to port 28 and thence returns to the pool. Thus the full cycle of water flow through the tank is incoming water to be filtered enters at first port 26, is passed to the leaf or cartridge filter elements 52, 62, respectively, filtered, passed down through the respective downcomers 58, 66, respectively, combined in the chamber 70 and passed from there to the second port continued extent 30 and then the second port 28 for return to the pool.

Where a free particulate type filtering medium is used, as shown at 78 in FIG. 5, the support comprises a dished or conical disc 80 which is provided with multiple series 82, 84, etc. of circularly distributed openings 86, each series being vertically spaced and radially stepped to define an overall perforate pattern in the wall 88 of the disc 80. The disc 80 is supported by its feet 90 resting on the lowermost wall 11 of the tank 10.

Figure 6:
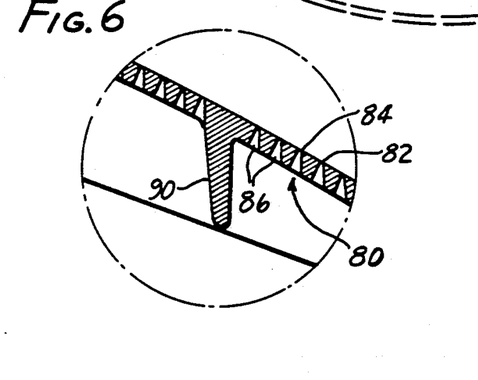
FIG. 6 is a view taken on line 6—6 in FIG. 5 and enlarged.
Figure 7:
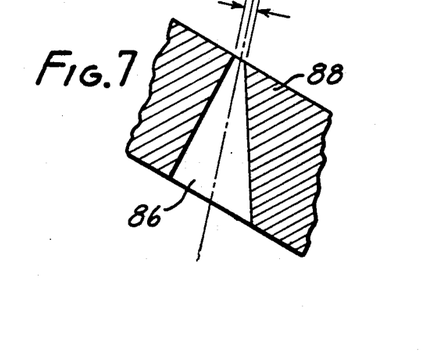
FIG. 7 is a detail view greatly enlarged of the downwardly divergent openings in the filter support shown in FIG. 5.

The wall openings 86 are small at the top and increase as they lengthen, i.e. are downwardly divergent so as to have maximum flow but not pass the particulate 78 reposed on the support disc 80. See FIGS. 6 and 7.

The identical plug 24 fitting is used in the bottom opening 22 of the tank 10 in the FIG. 5 embodiment. The flows in the respective ports 26, 28 are reversed however, as follows. With reference to FIG. 5, the continued extent 30 of the second port 28 instead of being coupled to the lower wall of a support 32 as in previous embodiments is carried to the top of the conical disc 80 where it is secured to riser 92, which carries water to above the mass of particulate 78. In this relation, the second port 28 is used for incoming water. The first port 26 accordingly has its flow reversed so as to act as a drain or outlet for filtered water passing through the mass 78 and the openings 86 into the underspaces 94 beneath the conical disc 80.

The apparatus therefore consists of a common tank, a common bottom opening fitting which is useable in first or reverse modes, a first filtering medium support useable with either a leaf filter or a cartridge filter, and a second filtering medium support which is useable with the common fitting and free particulate filtering media. Fewer parts thus have to be manufactured and inventoried with operating and capital savings resulting, in accordance with the invention.

I claim:

1. A swimming pool water filter adapted for recirculating water to and from a swimming pool, said filter comprising a filtering medium of the cartridge, leaf or free particulate type, and a filter structure containing such medium in pool water filtering relation, said structure comprising a tank enclosing said filtering medium, said tank having a bottom opening; a integral molded common bottom fitting in said tank bottom opening, said fitting defining first and second ports each adapted for reverse alternate inward or outward water flow in opposed relation, said first port communicating a first portion of the tank interior immediately adjacent said port with swimming pool water beyond said tank, said second port having a continued extent vertically within said tank, a filtering medium support comprising a disc supporting said filtering medium adjacently above said tank bottom opening, said disc defining a plurality of openings for receiving filtered water from said filtering medium, said disc being coupled to said second port continued extent for outflow of received filtered water from said filtering medium through said second port when said filtering medium is a cartridge or leaf filter and for inflow of unfiltered water to said filtering medium when said filtering medium is free particulate, and conversely said first port having an inward flow of unfiltered water when said second port flow is outward and outward flow of filtered water when said second port is inward.

2. The swimming pool water filter according to claim 1, in which said fitting comprises a molded plug body sealably mounted in said tank bottom opening, said first and second ports being formed along parallel axes within said plug body each offset from the tank vertical axis, said second port continued extent projecting into said tank above said plug body in angled relation to intersect said tank vertical axis.

3. The swimming pool water filter according to claim 1, in which said filtering medium is a mass of free particulate, said disc being generally conical and defining multiple concentric series of circularly distributed openings adapted to pass filtered water in particulate blocking relation, said conical disc having a central bore for snugly receiving said second port continued extent in unfiltered water passing relation to said particulate filtering medium.

4. The swimming pool water filter according to claim 3, in which said conical disc openings are downwardly divergent.

5. The swimming pool water filter according to claim 1, in which said filtering medium is a cartridge filter medium comprising a generally cylindrical mass of filter medium around a tubular downcomer, said disc defining a circularly distributed set of openings adapted to receive the lower end of each said downcomer in communicating relation with said second port.

6. A swimming pool water filter adapted for recirculating water to and from a swimming pool, said filter comprising a cartridge filtering medium and a filter structure containing such medium in pool water filtering relation, said structure comprising a tank enclosing said filtering medium, said tank having a bottom opening; an integral molded common bottom fitting in said tank bottom opening, said fitting defining first and second ports each adapted for reverse alternate inward or outward water flow in opposed relation, said first port communicating a first portion of the tank interior immediately adjacent said port with swimming pool water beyond said tank, said second port having a continued extent vertically within said tank, a filtering medium support comprising a disc supporting said filtering medium adjacently above said tank bottom opening, said disc defining a plurality of openings for receiving filtered water from said filtering medium, said disc being coupled to said second port continued extent for outflow of received filtered water from said filtering medium through said second port, said disc having upper and lower horizontally divided halves, said lower half being coupled to said second port continued extent, said upper half being joined to said lower half and defining said openings, said upper and lower halves defining a water collection chamber in open communication with said filter downcomers and said second port continued extent.

7. The swimming pool water filter according to claim 1, in which said filtering medium is a leaf filter medium comprising an arcuate frame having a central tubular downcomer, and a filter cloth over said frame, said disc defining a circularly distributed set of openings adapted to receive the lower end of each said downcomer in communicating relation with said second port.

8. The swimming pool water filter according to claim 7, in which said disc has upper and lower halves, said lower half being coupled to said second port continued extent, said upper half being joined to said lower half and defining said openings, said upper and lower halves defining a water collection chamber in open communication with said filter downcomers and said second port continued extent.

9. The swimming pool water filter according to claim 8, in which said disc has two sets of opening one open for said leaf filter downcomers and another closed but adapted to receive the downcomers of cartridge filters.

10. A swimming pool water filter comprising a fixed cloth filtering medium and a filter structure containing said medium in pool water filtering relation, said structure comprising a tank wall having an upper opening and a lower opening, a separable closure for the upper opening, unitary molded alternately reversible combination water inlet and outlet means sealably received in said lower opening, and a fixed cloth filtering medium support spaced adjacently above said lower opening, said medium support comprising a disc having integrally formed therein plural sets of circularly distributed openings for receiving filtered water from said medium for communication internally through said disc to said water outlet means, respective sets of said openings being differently sized and differently relatively disposed for different filter media, and means closing one or another of said sets in the alternative in the tank mounted condition of said support.

11. The swimming pool filter according to claim 10, in which said disc comprises a plastic molding.

12. The swimming pool filter according to claim 10, in which said disc defines a circularly distributed series of lobes, each of said lobes having openings of each of the alternative sets.

13. The swimming pool filter according to claim 10, in which said medium support has upper and lower horizontally extended and substantially coextensive portions, said lower portion communicating said support with said outlet, said upper portion defining said respective sets of openings, each of said sets being communicable in pool water flow receiving relation with a fixed cloth filter element, said lower portion being in open communication with said set openings.

14. The swimming pool filter according to claim 10, including also a filter element extending vertically within said tank, said filter element having an extended surface of filtering media and means to collect pool water passing through said media in filtering relation, said collecting means communicating directly with an opening of one or another of said sets.

15. The swimming pool filter according to claim 14, in which said filter element is a cartridge having cooperating mounting structure for support of said filter cartridge, said filter support structure upper portion defining a series of circularly distributed openings each receiving a said filter cartridge mounting structure in supporting relation, said upper portion further defining other filter element supporting openings, said other openings being blocked against unfiltered water flow therethrough.

16. The swimming pool filter according to claim 14, in which said filter element is a leaf filter element, said filter support structure upper portion defining a series of circularly distributed openings each receiving a said leaf filter element in supporting relation, said upper portion further defining other filter element supporting openings, said other openings being blocked against unfiltered water flow therethrough.

17. The swimming pool filter according to claim 16, in which each said other filter element supporting opening is adapted to receive when unblocked a cartridge filter.

18. The swimming pool filter according to claim 15, in which each said other filter element supporting opening is adapted to receive when unblocked a leaf filter element.

19. The swimming pool filter according to claim 13, in which said medium support upper and lower portions are separately molded mating parts.

20. The swimming pool filter according to claim 19, in which said tank upper opening is greater in diameter than the mounting locus of said filter elements in their respective openings and is defined by radially sloped shoulders, and including also a cover having radially sloped shoulders and a hipped clamping strap simultaneously engaging the sloped shoulders of both the opening and the cover with its hipped portions and traversing the intersection of said opening shoulders and said cover shoulders with an intermediate flat portion.

21. Filter element support for disposition in a filter tank, said support comprising upper and lower halves, the lower half having an upwardly open wall and a downwardly directed outlet adapted to communicate with the outlet of a filter tank, the upper half mating with the lower half and having a downwardly open wall substantially coextensive with said lower half wall and defining with said lower half wall an enclosed chamber in water tight relation, said upper half defining a first set of openings adapted to support the center rib downcomer of a leaf filter element and to interiorly communicate said center rib downcomer with said chamber in filtered water passing relation, said upper half further defining in alternating juxtaposition a second set of openings adapted to support the center downcomer of a cartridge filter element, said second sets being blocked against water passage therethrough when said first set is in supporting relation with said filter leaves, and first set being blocked against water passage therethrough when said second set is in supporting relation with said cartridge filter elements, the respective open and blocked sets being determined by the presence of the leaf filter or cartridge elements respectively in said filter tank.

22. In combination with the filter support claimed in claim 21, a plug having a first port defining a water inlet to said filter tank and a second port defining said water tank outlet and having a continued extent into said tank, said filter element support being supported within said tank by said second port continued extent, said second port and the center axis of said filter element support being relatively laterally offset.

23. In a swimming pool water filtering tank a free particulate filtering medium support comprising a conical disc having multiple concentric series of circularly distributed filtered water passing openings in vertically spaced relation, said openings being each downwardly divergent for maximum water flow downwardly therethrough without passage of particulate through the onset of said openings.

* * * * *